United States Patent Office 3,505,262
Patented Apr. 7, 1970

3,505,262
BONDING AGENTS BASED ON ALKALI METAL SILICATES
Helmut V. Freyhold, Dusseldorf-Oberkassel, and Volker Wehle, Hilden, Rhineland, Germany, assignors to Henkel & Cie, G.m.b.H., Dusseldorf-Holthausen, Germany, a corporation of Germany
No Drawing. Filed Nov. 16, 1967, Ser. No. 683,441
Claims priority, application Germany, Dec. 7, 1966, H 61,210
Int. Cl. C08g 45/00
U.S. Cl. 260—29.2                5 Claims

ABSTRACT OF THE DISCLOSURE

This invention relates to bonding agents based on alkali metal silicates comprising an aqueous alkali metal silicate solution admixed with from 2% to 26% by weight, based on the $SiO_2$ content of the alkali metal silicate solution, of crystalline triglycidyl isocyanurate having an epoxide oxygen content of at least 14% and from 0.33% to 26% by weight, based on the $SiO_2$ content of the alkali metal silicate solution, of a water-soluble amine epoxide resin hardener having at least two active hydrogen atoms bonded to nitrogen atoms.

THE PRIOR ART

The utilization of alkali silicate solutions and dispersions as bonding agents for coatings, in particular, paints, putties mineral insulating substances, impregnation and coating materials has been known for a long time and is effected to a great extent in practice.

Since alkali silicate solutions alone do not entirely meet the many sided technical requirements, such as sufficient water and climate resistance, temperature stability, hardness and flexibility, numerous suggestions for the improvement of these properties have been advanced in the form of suitable additions to the alkali metal silicate solutions. In particular, acids, acid-splitting or acid-reacting compounds, also basically reacting products, in particular, urea, have been suggested as hardeners. Likewise, additions of polyacrylates or phenol and urea resins have been employed to improve the flexibility. However, the large number of these suggestions known so far proves that the effects obtained have not been altogether satisfactory in practice.

OBJECTS OF THE INVENTION

An object of the invention is to further improve the bonding agents based on alkali metal silicates, especially to obtain a smooth, flawless film formation on the various base materials on which the solutions are applied, in addition to obtain a high resistance to water and a marked flexibility.

Another object of the present invention is the obtention of bonding agents based on alkali metal silicates comprising an alkali metal silicate solution containing from 2% ot 26% by weight, based on the $SiO_2$ content of the alkali metal silicate solution, of crystalline triglycidyl isocyanurate having an epoxide oxygen content of at least 14%, and from 0.33% to 26% by weight, based on the $SiO_2$ content of the alkali metal silicate solution, of a water-soluble amine epoxide resin hardener having at least two active hydrogen atoms bonded to nitrogen atoms.

These and other objects of the invention will become more apparent as the description thereof proceeds.

DESCRIPTION OF THE INVENTION

These objects have been achieved with the bonding agents based on alkali metal silicates, as it will be described hereinafter. These bonding agents of the invention are characterized by an alkali metal silicate solution having a content of triglycidyl isocyanurate having an epoxide oxygen content of at least 14%, at amounts of 2% to 26% by weight, preferably 4% to 17.5% by weight, based on the $SiO_2$ content of the alkali metal silicate solution, as well as water-soluble amines, which contain at least two active hydrogens bonded to nitrogen atoms in the molecule at amounts of 0.33% to 26% by weight, based on the $SiO_2$ content of the alkali silicate solution.

The preparation of purified crystalline triglycidyl isocyanurate with an epoxide oxygen content of at least 14% is known as such and is not the subject of the present application. This preparation is described in United States Patent No. 3,337,509, dated Aug. 22, 1967. The preparation of crystalline triglycidyl isocyanurate can be effected by reacting cyanuric acid with an excess of epichlorohydrin and subsequent purification of the precipitating noncrystalline raw product. If so desired, this can be accomplished by a single or repeated recrystallization from suitable solvents as, for example, methanol. In this manner, a crystalline product is obtained having the desired epoxide oxygen content. The theoretical epoxide oxygen content of the entirely pure product amounts to about 16.1%.

As water-soluble amines, such compounds are considered which are customarily utilized in hardening epoxide resins and which contain one or preferably several primary and/or secondary amino groups. These amines can be of an aliphatic as well as a cyclic structure. The cyclic amines can contain cycloaliphatic, aromatic, as well as heterocyclic rings. Furthermore, such amines can be utilized which contain several of the rings previously mentioned. In heterocyclic amines, the amino nitrogen can also represent a constituent of the ring. The, at least two, active hydrogen atoms in the amines can be attached to the same or separate nitrogen atoms. As examples of the primary and secondary amines mentioned, the following may be cited: alkylamines such as propylamine, hexylamine, dodecylamine; phenylalkylamines such as benzylamine; alkanediamines such as ethylenediamine, propylenediamine, butylenediamine, dimethylaminopropylamine, diethylaminopropylamine; alkanepolyamines such as diethylenetriamine, triethylenetetramine, tetraethylenepentamine; cycloalkylamines such as cyclohexylamine; cycloalkanediamines such as 1,2- or 1,4 - diaminocyclohexane, 1,2-diamino-4-ethylcyclohexane, 1-cyclohexyl - 3,4 - diaminocyclohexane; diaminodicycloalkylalkanes such as 4,4'-diaminodicyclohexylmethane; etc.

Moreover, such amines can be employed for the epoxide resin hardening reaction according to the invention, which contain additional functional groups, as for example, alkanolamines such as ethanolamine, propanolamine; or the reaction products of amines with ethyleneoxide and propyleneoxide, such as N-(hydroxyethyl)-1,2-diaminopropane, N-(hydroxypropyl) - m - phenylenediamine, N,N' - di - (hydroxybutyl) - diethylenetriamine. Also suitable are dicyano-ethylethylenediamine, 1,4-bis-(γ-aminopropoxymethyl) - cyclohexane, N-(4 - hydroxybenzyl) - ethylenediamine, N - (4-hydroxybenzyl) - diethylenetriamine.

The amount of the water-soluble amines utilized depends on the type of the amine, in particular, on the number of active hydrogens bonded to nitrogen atoms. It has been found advantageous, in general, to measure the amounts so that 0.6 to 1.1, preferably 0.8 to 1, equivalent of active hydrogen of the amine component is allotted to each equivalent of epoxide oxygen of the triglycidyl isocyanurate. However, a greater excess of the water-soluble amine can be employed particularly where the amine contains both primary and secondary amine groups such as the alkanepolyamines. While the alkanepolyamines are utilized primarily in the examples, all of the above-mentioned water-soluble amines can be utilized in the practice of the invention.

The concentration of the alkali metal silicate solutions as well as the molar ratio of $SiO_2$ to alkali metal oxide in the solutions may fluctuate within wide ranges and it depends on the respective utilization of the bonding agent. As a rule, commercially available sodium, potassium or lithium silicate solutions are employed. Furthermore, according to the purpose of utilization, the usual, alkali-resistant pigments or fillers, as for example, chalk, kaolin, zinc oxide, chrome-green, ferric oxide-pigments, quartz powder, talc, mica and perlite, can be incorporated in the bonding agents of the invention.

The preparation of the bonding agent is effected by simply admixing the components. Advantageously, under stirring the triglycidyl isocyanurate is introduced into the alkali metal silicate solution at slightly elevated temperatures (20° C. to 50° C.) and in solid, usually crystallized form. It can also be added or suspended in water. Next, the amine component, preferably dissolved or suspended in a small amount of water, is added while stirring.

The thus prepared bonding agents are utilized in the known fields of alkali metal silicate application as described in the beginning. With these new agents, flawless films can be produced on base materials of a wide variety, such as cement plaster, concrete, glass, ceramics and wood. The hardening is preferably effected at normal temperatures. Other advantages consist in that a high degree of waterproofness is obtained with these new bonding agents in addition to a marked flexibility and good flame-resistant properties.

The following examples are illustrative of the practice of the invention. They are not, however, to be deemed limitative in any respect.

EXAMPLE 1

Under light heating and stirring, 10 parts by weight of crystalline triglycidyl isocyanurate (technical mixture of the high and low melting forms, epoxide oxygen content, 15.5%) were introduced into 250 parts by weight of a sodium silicate solution (molar ratio of $SiO_2$ to $Na_2O=3.9$ to 1; $SiO_2$ content=23% by weight). Next, 6.3 parts by weight of tetraethylenepentamine, dissolved in 10 parts by weight of water, were added. The stirring was continued until the viscosity had become constant. The thus prepared bonding agent was utilized in this and the following examples in a variety of ways.

Then, 30 parts by weight of the thus prepared bonding agent were admixed, for the preparation of a coating agent, with 20 parts by weight of a pigment mixture which consisted of ⅓ each of talc, micromica and titanium dioxide. Next, this coating material was applied onto asbestos-cement plates. After a period of 24 hours of drying, the film was boil-proof against water and, consequently, weather resistant.

Following the procedures of the above, a potassium silicate solution was utilized to give a bonding agent of almost identical properties.

EXAMPLE 2

For the production of a ceramic molded body, 45 parts by weight of an alkali metal silicate binder, prepared as described in Example 1, paragraph 1, were thoroughly admixed with 35 parts by weight of vermiculite (bulk weight=150 gm./l.) and then cold-pressed into a plate. After 24 hours of drying, this plate was substantially insensitive to moisture. Following an identical procedure, but without the addition of the triglycidyl isocyanurate and amine contents in the bonding agent, the plate decomposed after having been placed in water for about 5 minutes.

EXAMPLE 3

A nautrally moist, coarse-grained pumice stone was impregnated with an alkali metal silicate bonding agent. This agent, prepared as described in Example 1, paragraph 1, was diluted with water at a ratio of 1 to 10. After having been drained over a strainer, the product was admixed with 240 kg. of cement per 1 cubic meter and filled into sectional earthenware forms. The introduced mass hardened within about 8 hours. The water absorbability was considerably reduced with reference to sectional forms, which had been prepared in the same fashion with an alkali metal silicate bonding agent, however, without the addition of the invention.

EXAMPLE 4

300 gm. of a sodium silicate solution (48/50° Bé.), with a $SiO_2$ to $Na_2O$ molar ratio of 2.76 to 1, and a $SiO_2$ content of 32.8%, were admixed with 85 gm. of $H_2O$ and 10 gm. of crystalline triglycidyl isocyanurate (mixture of the high and low melting forms, epoxide oxygen content, 15.5%), and the mixture was held at a temperature of 50° C. until it had become clear. Next, the reaction mixture was cooled, and 6 gm. of diethylenetriamine, dissolved in 85 gm. of $H_2O$ were added thereto.

For the preparation of a coating, 30 parts by weight of the thus prepared bonding agent were admixed with 20 parts by weight of a pigment mixture, consisting of ⅓ each of talc, micromica and titanium dioxide. Next, cement plaster was painted with this coating. The coating formed, after hardening and drying, a film about 0.15 mm. thick which was free of cracks and weather resistant.

EXAMPLE 5

300 gm. of a sodium silicate solution (48/50° Bé.), with a $SiO_2$ to $Na_2O$ molar ratio of 2.76 to 1, and a $SiO_2$ content of 32.8%, were admixed with 85 gm. of $H_2O$ and 10 gm. of crystalline triglycidyl isocyanurate (mixture of the high and low melting forms, epoxide oxygen content, 15.5%), and the mixture was held at a temperature of 50° C. until it had become clear. Next, the reaction mixture was cooled, and 2.8 gm. of ethanolamine, dissolved in 85 gm. of $H_2O$ were added thereto.

For the preparation of a coating, 30 parts by weight of the thus prepared bonding agent were admixed with 20 parts by weight of a pigment mixture, consisting of ⅓ each of talc, micromica and titanium dioxide. Next, cement plaster was painted with this coating. The coating formed, after hardening and drying, a film about 0.15 mm. thick which was free of cracks and weather resistant.

The bonding agents of the invention can be prepared utilizing any of the water-soluble amines indicated in the description, such as the alkylamines, alkanediamines, alkanepolyamines, cycloalkylamines, cycloalkanediamines, diaminodicycloalkylalkanes, phenylalkylamines, as well as the amines containing additional functional groups, with equivalent results. Likewise any alkali metal silicate solution such as sodium, potassium or lithium silicate solutions can be employed with comparable results.

The preceding specific embodiments are illustrative of the practice of the invention. It is to be understood, however, that other expedients known to those skilled in the art can be utilized without departing from the spirit of the invention.

We claim:

1. Bonding agents based on alkali metal silicate consisting essentially of an aqueous alkali metal silicate solution admixed with from 2% to 26% by weight, based on the $SiO_2$ content of said alkali metal silicate solution, of crystalline triglycidyl isocyanurate having an expoxide oxygen content of at least 14%, and from 0.33% to 26% by weight, based on the $SiO_2$ content of said alkali metal silicate solution, of a water-soluble amine epoxide resin hardener having at least two active hydrogen atoms bonded to nitrogen atoms.

2. The bonding agents of claim 1 wherein said crystalline triglycidyl isocyanurate is admixed in an amount of from 4% to 17.5% by weight, based on the $SiO_2$ content of said alkali metal solution.

3. The bonding agents of claim 1 wherein the content of said water-soluble amine epoxide resin hardener admixed is selected so that from 0.6 to 1.1 equivalents of active hydrogen bonded to amino nitrogen atoms are present for each epoxide oxygen equivalent in said crystalline triglycidyl isocyanaurate.

4. The bonding agents of claim 1 wherein said aqeuous alkali metal silicate solution is an aqueous sodium silicate solution.

5. The bonding agents of claim 1 having a further admixture of alkali resistant materials selected from the group consisting of pigments and fillers.

References Cited

UNITED STATES PATENTS

| | | | |
|---|---|---|---|
| 2,850,397 | 9/1958 | Dereich | 106—83 |
| 3,132,142 | 5/1964 | Hopkins | 156—330 XR |
| 3,337,509 | 8/1967 | Budhowski. | |
| 3,349,053 | 10/1967 | Ashby | 260—29.2 |

WILLIAM SHORT, Primary Examiner

E. A. NIELSEN, Assistant Examiner

U.S. Cl. X.R.

161—170, 168; 117—161, 123, 124, 126, 148; 156—330; 260—2